(12) United States Patent
Fair (10) Patent No.: US 6,938,434 B1
(45) Date of Patent: Sep. 6, 2005

(54) COOLING SYSTEM (76) Inventor: Shields Fair, 1248 E. Palm La., Phoenix, AZ (US) 85006

( * ) Notice: Subject to any disclaimer, the term of this patent is extended or adjusted under 35 U.S.C. 154(b) by 0 days.

(21) Appl. No.: 10/352,652

(22) Filed: Jan. 28, 2003

Related U.S. Application Data (60) Provisional application No. 60/352,694, filed on Jan. 28, 2002.

(51) Int. Cl.[7] .............................................. F25D 17/00
(52) U.S. Cl. ........................... 62/309; 62/121; 261/159; 261/118
(58) Field of Search .................... 62/308, 309, 121, 62/92, 314; 261/161, 159, 118

(56) References Cited

U.S. PATENT DOCUMENTS

| | | | | |
|---|---|---|---|---|
| 4,023,949 A | * | 5/1977 | Schlom et al. ................. | 62/309 |
| 4,123,917 A | * | 11/1978 | Curtis et al. .................. | 62/309 |
| 4,156,351 A | * | 5/1979 | Schlom et al. ................. | 62/121 |
| 4,538,426 A | | 9/1985 | Bock | |
| 4,910,971 A | * | 3/1990 | McNab ......................... | 62/310 |
| 5,692,384 A | | 12/1997 | Layton | |
| 5,724,828 A | * | 3/1998 | Korenic ........................ | 62/305 |
| 5,927,097 A | | 7/1999 | Wright | |
| 5,979,172 A | | 11/1999 | Teller | |
| 6,055,824 A | * | 5/2000 | Kuma et al. ................... | 62/314 |
| 6,213,200 B1 | * | 4/2001 | Carter et al. ................. | 165/285 |
| 6,385,987 B2 | * | 5/2002 | Schlom et al. ................. | 62/304 |
| 6,418,728 B1 | * | 7/2002 | Monroe ......................... | 62/3.2 |

* cited by examiner

Primary Examiner—William E. Tapolcai
Assistant Examiner—Mohammad M. Ali
(74) Attorney, Agent, or Firm—Parsons & Goltry; Michael W. Goltry; Robert A. Parsons (57) ABSTRACT

A system is disclosed that incorporates a generator for generating a liquid coolant. This invention provides a self-contained water (or similar liquid coolant) chilling system of suitable capacity to cool small to medium size structures, such as private residences and manufactured homes. The system utilizes an arrangement of heat-exchanging panels to pre-condition an ambient temperature air-stream, prior to passage through a pump-driven coolant spray. The system also provides several sub-systems for automatic coolant monitoring, chemical addition and periodic coolant replacement.

18 Claims, 7 Drawing Sheets

COOLING SYSTEM

CROSS-REFERENCE TO RELATED APPLICATIONS

This application claims the benefit of Provisional Application Serial No. 60/352,694, filed Jan. 28, 2002.

FIELD OF THE INVENTION

This invention relates to heat transfer apparatus and methods for providing conditioned air to habitable structures.

BACKGROUND OF THE INVENTION

Typically, cooling systems, such as those used for cooling structures, such as buildings and trailers, consist of systems that cool the air. The air-cooling is performed in many ways, such as using cooled refrigerant, cooled air or cooled water. Evaporative cooling systems have historically been less expensive than refrigerant systems. Evaporative systems that utilize the evaporation of water, such as those that use pads soaked with water and have air drawn through them, have been in use for many years. Such evaporative systems, however, tend to humidify the air within the structure, causing reduced occupant comfort after a certain dew point is reached.

The use of cooled water systems, such as those using cooling towers, is well-known in large-scale commercial applications. The residential use of circulating cooled water to cool the air within a structure has not been well received, due to set-up and operating costs. Additionally, the perceived negative aesthetics of most traditional cooled water systems has limited the broader adoption of use in residential applications. A cooling system that would economically and efficiently cool the air within a structure, using cooled liquid (water) to transfer the heat from the structure's air as a means to cool the air and not add humidity to the air, would be advantageous.

Accordingly, a primary object and feature of the present invention is to provide a system for cooling a liquid coolant. It is a further object and feature of the present invention to provide a system for using such liquid coolant that is of suitable capacity to cool small to medium-sized structures, such as private residences and manufactured homes. A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a cooling system comprising, in combination: at least one container means for containing at least one liquid coolant supply, each such at least one container means having an interior and an exterior; at least one incoming air passage means for providing air passage into such at least one container means, and at least one outgoing air passage means for providing air passage out of such at least one container means; at least one air mover means for moving at least one first stream of air, from ambient air, through such at least one incoming air passage means into such at least one container means; located within such at least one container means, at least one spray means for spraying liquid coolant from the at least one liquid coolant supply through the at least one first stream of air; wherein such at least one container means is structured and arranged so that the at least one first stream of air becomes at least one coolant-holding second stream of air passing through such at least one outgoing air passage means; a thermal transfer means comprising at least portions of such at least one incoming air passage means and such at least one outgoing air passage means, for assisting thermal transfer between the at least one coolant-holding second stream of air and the at least one first stream of air; and at least one liquid coolant mover means for moving liquid coolant from the at least one liquid coolant supply through such at least one spray means; wherein such at least one container means comprises at least one coolant collection means for collecting liquid coolant.

Additionally, it provides such a system wherein a substantial portion of such at least one container means further comprises a thermal insulation means for thermally insulating such interior of such at least one container means from such exterior of such at least one container means. Further, it provides such a system wherein the liquid coolant from such at least one coolant collection means passes through a heat exchanger, then through such at least one spray means.

In accordance with another preferred embodiment hereof, this invention provides a cooling system comprising, in combination: at least one container structured and arranged to contain at least one liquid coolant supply, each such at least one container having an interior and an exterior; at least one incoming air passage structured and arranged to provide passage into such at least one container, and at least one outgoing air passage structured and arranged to provide passage out of such at least one container; at least one air mover structured and arranged to move at least one first stream of air, from ambient air, through such at least one incoming air passage into such at least one container; at least one sprayer, within such at least one container, structured and arranged to spray liquid coolant from the at least one liquid coolant supply through the at least one first stream of air; wherein such at least one container is structured and arranged so that the at least one first stream of air becomes at least one coolant-holding second stream of air passing through such at least one outgoing air passage; at least one thermal transfer system, including at least portions of such at least one incoming air passage and such at least one outgoing air passage, structured and arranged to assist thermal transfer between the at least one coolant-holding second stream of air and the at least one first stream of air; and at least one liquid coolant mover structured and arranged to move liquid coolant from the at least one liquid coolant supply through such at least one sprayer; wherein such at least one container comprises at least one coolant collector structured and arranged to collect liquid coolant.

Additionally, it provides such a system wherein a substantial portion of such at least one container further comprises a thermal insulation, structured and arranged to thermally insulate such interior of such at least one container from such exterior of such at least one container. Moreover, it provides such a system wherein the liquid coolant from such at least one coolant collector passes through a heat exchanger, then through such at least one sprayer. Further, it provides each and every novel detail, feature, article, process, system and/or method disclosed in or mentioned by or shown in this disclosure document.

BRIEF DESCRIPTION OF THE DRAWINGS

Referring to the drawings.

DETAILED DESCRIPTION OF PREFERRED EMBODIMENTS

Figure 1:
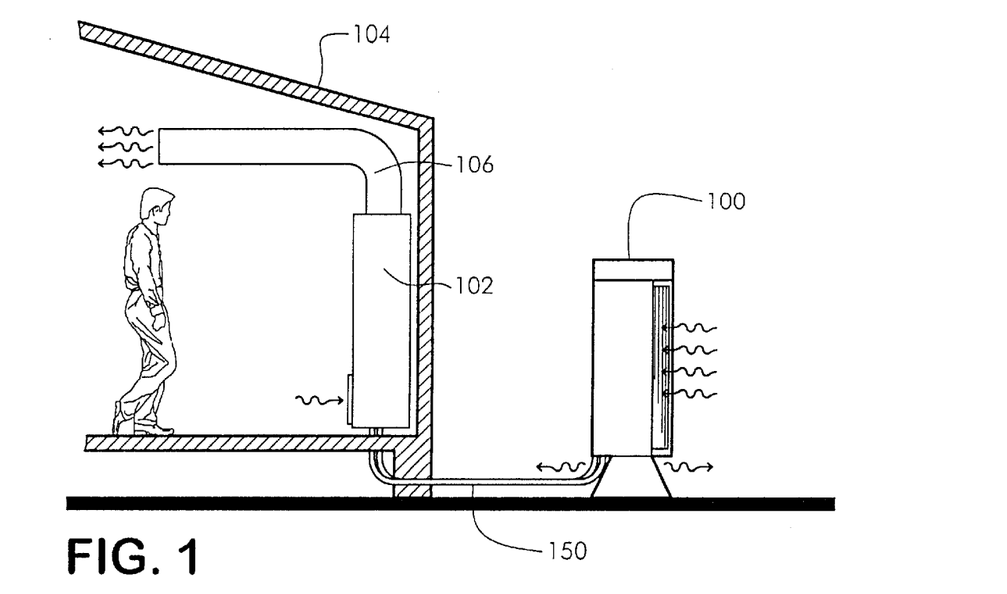
FIG. 1 is a perspective view of a cooling system according to a preferred embodiment of the present invention.

Reference is now made to the drawings. FIG. 1 is a perspective view of the cooling system 100, according to a preferred embodiment of the present invention. Illustrated is a cooling system 100 used to generate a cooled liquid coolant that is delivered through at least one liquid coolant transfer system 150, to at least one structure heat exchanger 102, for cooling the air inside the interior of a habitable structure 104 through one or more air ducts 106, as shown.

Figure 2:
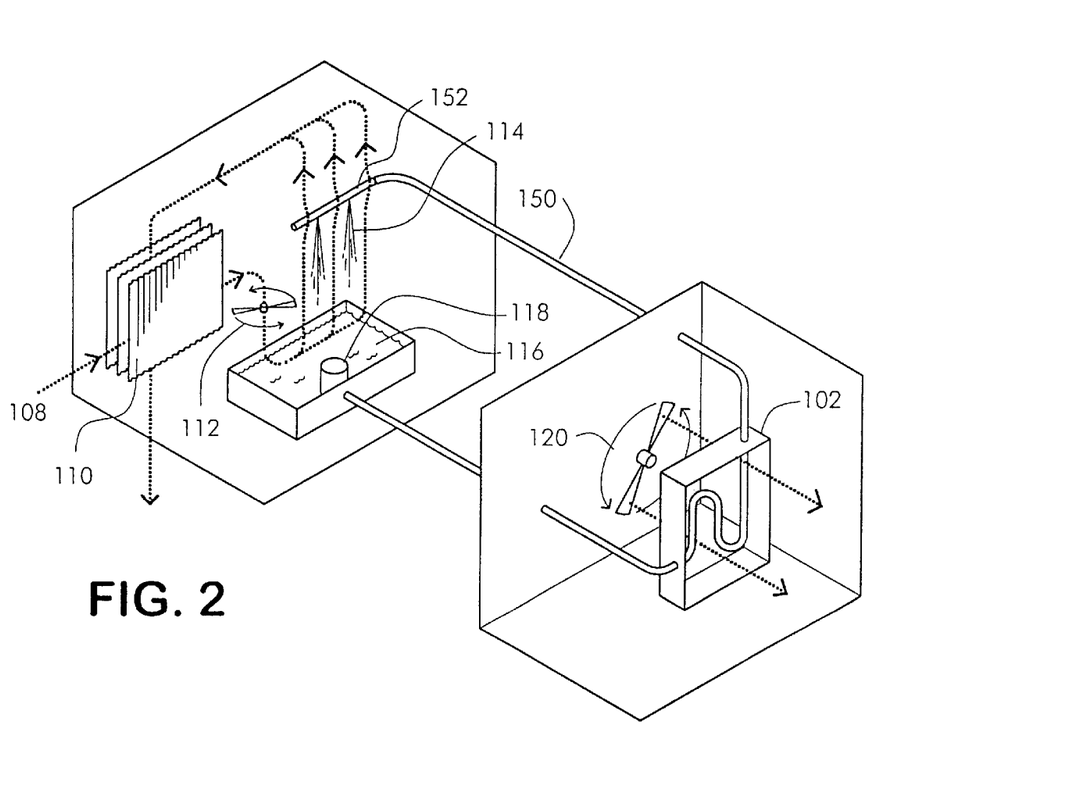
FIG. 2 is a diagrammatic view of air and water through a preferred embodiment of the present invention.

FIG. 2 is a diagrammatic view of air and liquid coolant through a preferred embodiment of the present invention. Preferably, the intake air 108 is drawn horizontally through at least one heat exchanger 110 by at least one blower 112 (embodying herein at least one air mover), as shown. Preferably, the air stream (embodying herein at least one first stream of air) is then forced up through at least one liquid coolant spray 114 (embodying herein at least one sprayer), and exhausted, vertically downward, through at least one heat exchanger 110 (embodying herein at least one container, structured and arranged so that the at least one first stream of air becomes at least one coolant-holding second stream of air passing through such at least one outgoing air passage). Preferably, the liquid coolant spray 114 is collected in at least one liquid coolant supply collector 116 (the above-described arrangement embodying herein at least one coolant collector structured and arranged to collect liquid coolant) and circulated by at least one pump 118 (embodying herein at least one liquid coolant mover structured and arranged to move liquid coolant from the at least one liquid coolant supply through such at least one sprayer), through the structure heat exchanger 102 within the interior of the habitable structure 104, and back through the liquid coolant spray 114 (embodying herein an arrangement wherein the liquid coolant from such at least one coolant collector passes through a heat exchanger, then through such at least one sprayer), as shown. Preferably, the air inside the interior of the habitable structure 104 is blown over the structure heat exchanger 102 by external blower 120, as shown.

Figure 3:
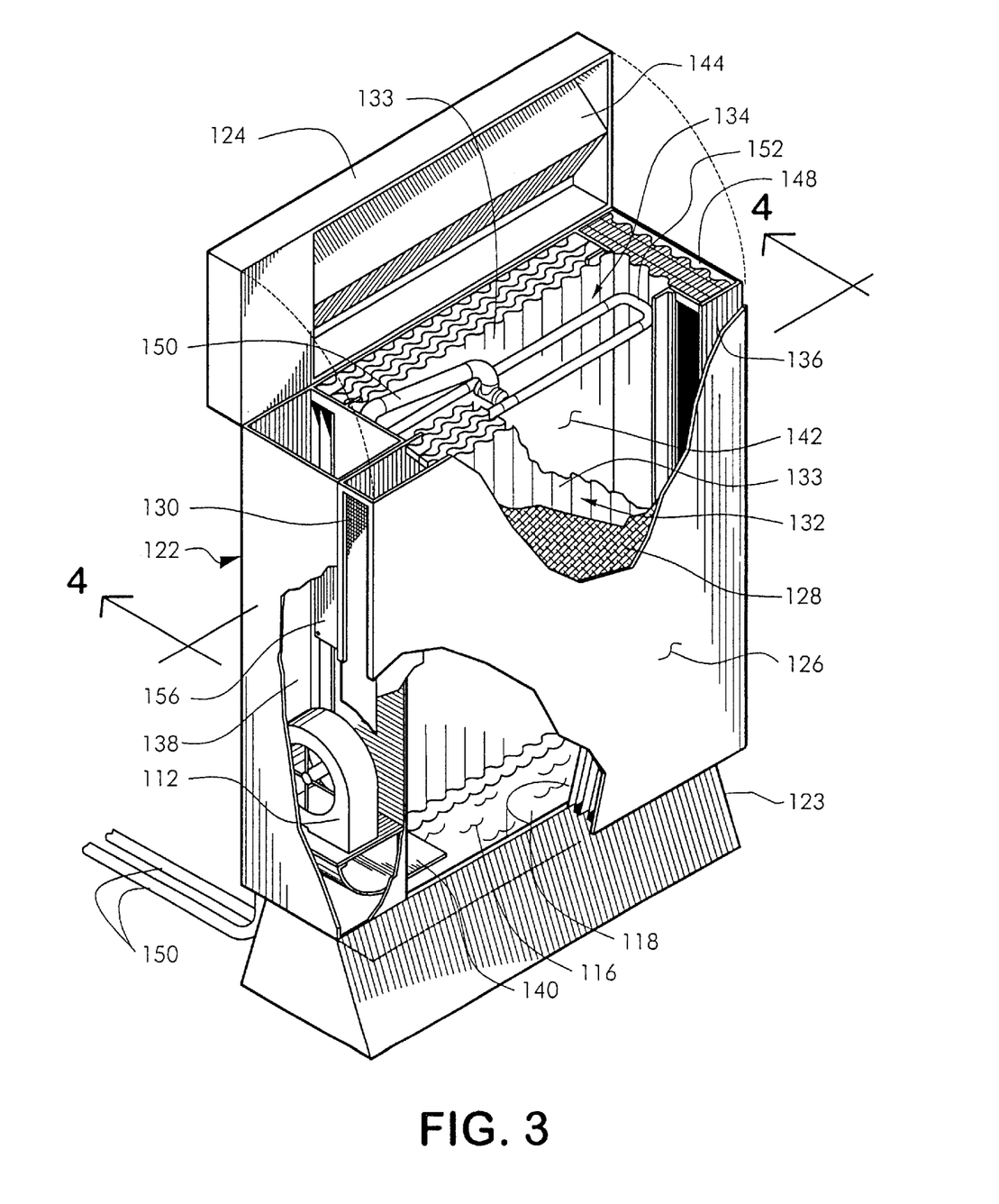
FIG. 3 is a perspective view of the cooling system in FIG. 1, partially in section.

FIG. 3 is a perspective view of the cooling system in FIG. 1, partially in section. Preferably, cooling system 100 comprises at least one container 122 (embodying herein at least one container structured and arranged to contain at least one liquid coolant supply, each such at least one container having an interior and an exterior), as shown. Preferably, the container 122 is constructed from a molded polymer material, such as polycarbonate, and is rectangular with an angular-shaped container base 123. The angular container base 123 is preferably constructed from the same material as the container 1221(under appropriate circumstances, materials other than molded polymer or polycarbonate may suffice). Preferably, the container 122 has at least one hinged lid 124, pivoting on at least one hinge 125, and at least one hinged door 126, pivoting on at least one hinge 127 (the hinges are shown in greater detail in FIGS. 5 and 7).

Preferably, the container 122 is substantially lined with a radiant barrier 128 (herein embodying a substantial portion of such at least one container further comprising a thermal insulation, structured and arranged to thermally insulate such interior of such at least one container from such exterior of such at least one container). Preferably, the radiant barrier 128 is equal to "Microfoil" available from Packaging Technologies, Incorporated. Preferably, ambient intake air is drawn through the container 122 by blower 112 through at least one filter 130 (embodying herein, at least one incoming air passage structured and arranged to provide passage into such at least one container), as shown. The filter 130 is preferably at least one mesh screen sized such that large particles are filtered from entering the cooling system 100. Preferably, the air is then drawn by blower 112 through at least one heat exchanger 110.

Figure 4:
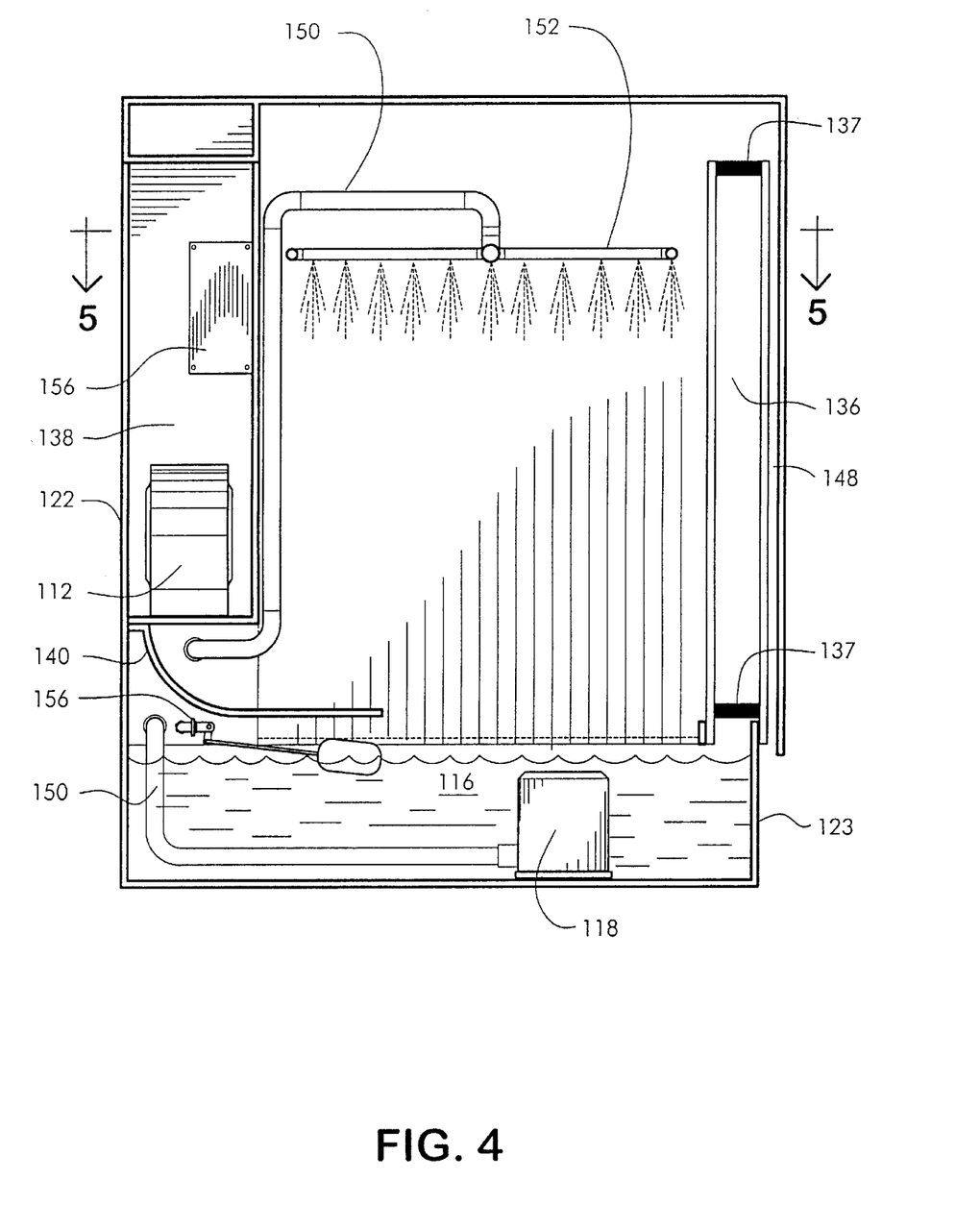
FIG. 4 is a sectional view through the section 4—4 of FIG. 3.
Figure 5:
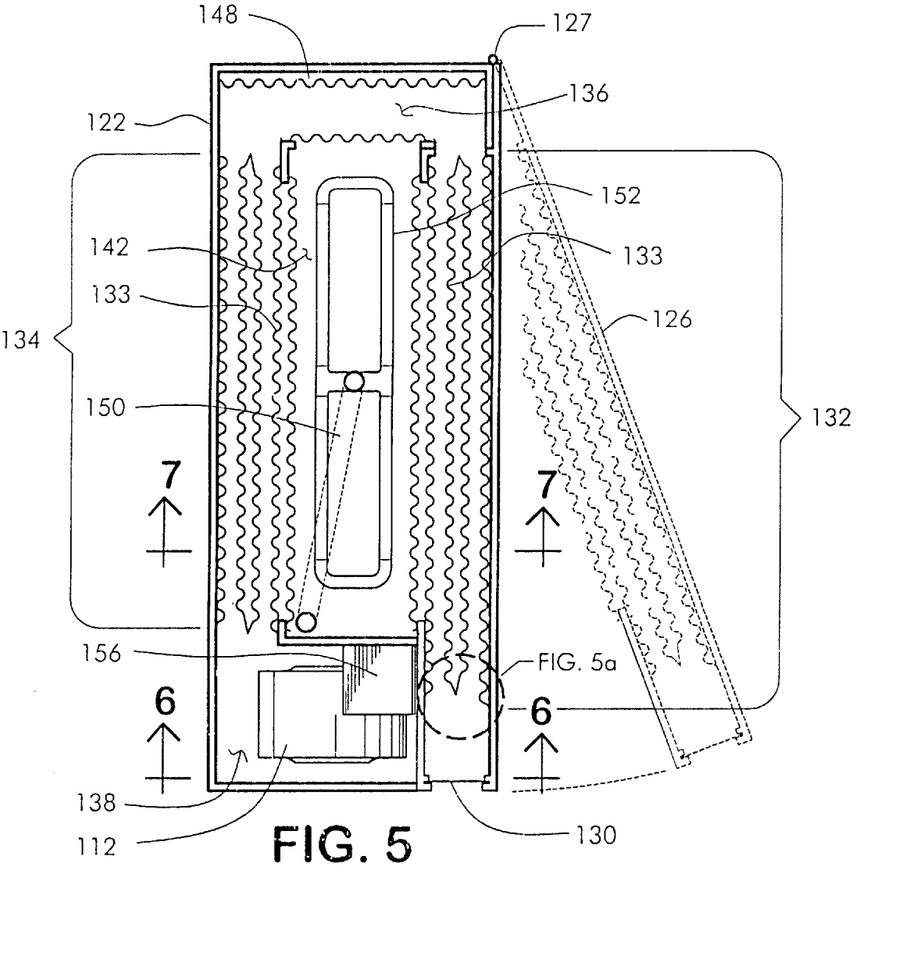
FIG. 5 is a sectional view through the section 5—5 of FIG. 4.

Preferably, the heat exchanger 110 comprises three main sections; a first heat exchanger section 132 and a second heat exchanger section 134, linked by a third section serving as an air transfer duct 136 (the three sections are more clearly illustrated in FIG. 4 and FIG. 5). Preferably, both first heat exchanger section 132 and second heat exchanger section 134 further comprise a plurality of heat-exchanging corrugated-panels 133. Preferably, each heat exchange section comprises at least four heat-exchanging corrugated panels 133 made of aluminum (or galvanized steel covered with an epoxy powder coating to limit corrosion), and at least one heat-exchanging corrugated panel 133 made of fiberglass. The fiberglass panels preferably form the walls of the liquid coolant spray chamber 142, as shown. The air transfer duct 136 is preferably comprised of at least one heat-exchanging corrugated panel 133, preferably aluminum (or galvanized steel covered with an epoxy powder coating to limit corrosion), on the container 122 side of the duct, and at least one heat-exchanging corrugated panel 133, preferably fiberglass, on the liquid coolant spray chamber 142 side of the duct, as shown. Under appropriate circumstances, other corrosive-resistant materials may be used in constructing the heat exchanger 110.

The combined horizontal length of the two heat exchange sections 132 and 134 and the air transfer duct 136 is preferably about nine feet. Preferably, each of the heat-exchanging corrugated panels 133 has a first side and a second side, as shown. Preferably, the intake air stream travels across the first side of the heat exchanging corrugated panels 133 within the first heat exchange section 132, then through the air transfer duct 136, and finally across the first side of the heat exchanging corrugated panels 133 within the second heat exchange section 134 before exiting the heat exchanger 110 (embodying herein at least one thermal transfer system, including at least portions of such at least one incoming air passage and such at least one outgoing air passage, structured and arranged to assist thermal transfer between the at least one coolant-holding second stream of air and the at least one first stream of air).

Preferably, after exiting heat exchanger 110, the air stream enters the blower chamber 138, as shown. Preferably, blower 112 then discharges the air over an air deflector 140, as shown. Preferably, the blower is a variable speed unit (preferably a Dayton® 1/3 horsepower variable speed blower, 1000 cfm to 2000 cfm air delivery, No. 5C092) mounted for bottom horizontal discharge, as shown. Preferably, the air stream is deflected by the air deflector 140 and is forced across the liquid coolant supply collector 116 and up through the liquid coolant spray 114, in the liquid coolant spray chamber 142, as shown. The deflector 140 is preferably comprised of curved polycarbonate. Under appropriate circumstances, the use of other materials in the construction of the air deflector 140 may suffice.

As previously mentioned, the walls of the liquid coolant spray chamber are preferably comprised of a corrugated fiberglass. As the air stream exits the liquid coolant spray chamber 142, it is preferably deflected in three directions by at least one air deflector 144. At least one air defector 144, as shown in FIG. 3, is located, preferably, within the hinged lid 124 and is preferably comprised of polycarbonate and in a V-shaped configuration (under appropriate circumstances, other materials and deflector shapes may suffice). Preferably, the air is deflected vertically down across the second side of the heat-exchanging corrugated panels 133 located within the first heat exchanger section 132, across the second side of the heat-exchanging corrugated panels 133 located within the second heat exchanger section, and down through at least one rear exhaust slot 148. The rear exhaust slot 148, as shown in FIG. 3, is preferably located between the air transfer duct 136 and the container 122. Preferably, the air is then exhausted to the environment outside the container 122 (embodying herein at least one outgoing air passage structured and arranged to provide passage out of such at least one container).

Preferably, as shown in FIG. 3, the container base 123 of the cooling system 122 comprises the liquid coolant supply collector 116, as shown. Preferably, located within the liquid coolant supply collector 116 is at least one pump 118, as shown. Preferably, the pump 118 is used to transfer the cooled liquid coolant through at least one liquid coolant transfer system 150, to at least one structure heat exchanger 102 for cooling the air inside the interior of at least one habitable structure 104 (as shown in FIG. 1), before returning to at least one liquid coolant spray assembly 152 within the liquid coolant spray chamber 142. Preferably, the pump 118 is a submersible utility unit (Little Giant® 1/6 horsepower, No. 2P352, designed to pump at fourteen gallons per minute against fifteen feet of head). The liquid coolant transfer system 150 is preferably comprised of standard one-inch diameter thin-walled PVC piping and fittings (under appropriate circumstances, other materials and sizes may suffice). The pump 118 and the liquid coolant spray assembly 152 are further illustrated in FIGS. 4 and 5, respectively.

FIG. 4 is a sectional view through the section 4—4 of FIG. 3. This figure more clearly illustrates the liquid coolant supply collector 116, location of the pump 118, and coolant spray assembly 152. As shown in FIG. 4, at least one float valve assembly 154 is preferably located within the liquid coolant supply collector 116. Preferably, as shown, at least one standard float valve assembly (Watts Regulator float valve assembly, No. 2X768) is used to maintain the amount of liquid coolant in the liquid coolant supply collector 116, as shown. Preferably, connected at the base of the float valve assembly 154 is liquid coolant supply tubing 155 (illustrated in FIGS. 10, 11 and 12) for maintaining the minimum amount of liquid coolant in the liquid coolant supply collector 116, as shown. Preferably, the liquid coolant supply tubing 155 is 1/4 inch OD polyethylene tubing (under appropriate circumstances, other tubing materials may be utilized). In the preferred embodiment of the present invention, the capacity of the liquid coolant supply collector 116 is preferably about thirty-seven gallons. Preferably, as shown in FIG. 4, air deflector 140 is appropriately sized to sufficiently cover the float valve assembly 154, protecting the assembly from the downward discharge of air from blower 112, thereby accurately maintaining the optimal amount of liquid coolant in the liquid coolant supply collector 116, as shown. The liquid coolant spray assembly 152 is preferably configured such that liquid coolant is evenly broadcast within substantially the entire liquid coolant spray chamber 142, as shown.

Preferably located within the blower chamber 138 is at least one control panel 156 for housing controls to operate the cooling system 100, as shown. Preferably, the electrical components of the cooling system 100 operate on 110 Volts. Additionally, the controllers {electronic or mechanical) housed in the control panel 156 preferably comprise controls {electronic or mechanical) for the operation of the blower 112 and the pump 118. Further, the control panel 156 preferably houses at least one multi-station timer {electronic or mechanical), preferably two-station timer unit, with a user-adjustable timer function to initiate, at least once a week, an action to evacuate the liquid coolant supply collector 116, and secondly, to initiate at least one action to add chemicals {i.e., surfactant, etc.) to the coolant system, as necessary. Preferably, with the hinged door 126 in an open position, the control panel 156 is accessible for service, as shown.

More clearly depicted in FIG. 4 is the preferred air transfer duct 136 arrangement, structured to prevent the mixing of air moving within the heat exchanger 110 with the air or liquid entering or exiting the liquid coolant spray chamber 142. Preferably, the air transfer duct is enclosed on the top and bottom by a continuous wood or plastic cover 137, mechanically fastened or adhesively bonded to the side walls of the duct, as shown.

Figures 6, 7:
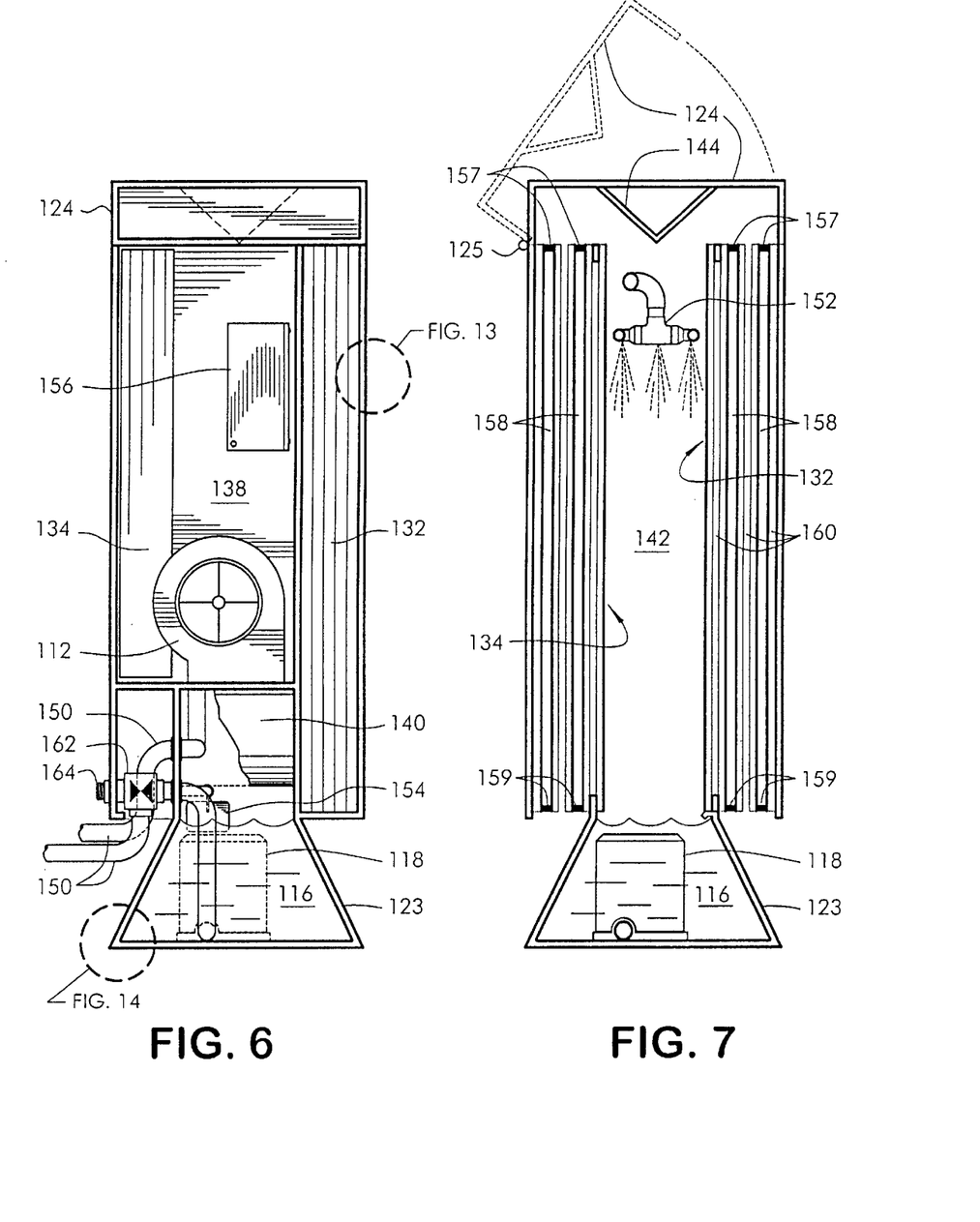
FIG. 6 is a sectional view through the section 6—6 of FIG. 5.
FIG. 7 is a sectional view through the section 7—7 of FIG. 5.

FIG. 5 is a sectional view through the section 5—5 of FIG. 4. Preferably, as shown in FIG. 5, the first heat exchange section 132 and the second heat exchange section 134, each comprise at least five heat-exchanging corrugated panels 133, as shown. Preferably, each heat-exchanging corrugated panel 133 further comprises a first side and second side, with the first side of heat-exchanging corrugated panels 133 preferably forming at least two first side air channels 158, with at least 400 square inches of cross-sectional area, open to transfer only intake air in a horizontal direction through the heat exchanger 110. The first side air channels 158 formed by the first side of the heat-exchanging corrugated panels 133 are enclosed with a first side air channel top closure 157 and a first side air channel bottom closure 159 (as shown in FIG. 7). Preferably, the first side air channel top closure 157 and first side air channel bottom closure 159 function to isolate the horizontal intake airflow from other air flows within the heat exchanger 110, as shown. Preferably, the first side air channel top closure 157 and first side air channel bottom closure 159 are constructed of wood or plastic formed to the shape of the heat-exchanging corrugated panels and mechanically fastened or adhesively-adhered to the top and bottom of the panels, as shown. The second side of the heat-exchanging corrugated panels 133 preferably form at least three second side air channels 160, with at least 280 square inches of cross-sectional area, open only to vertically exhaust air deflected by air deflector 144 in a downward direction to the ambient environment, as shown. Preferably, the second side air channels 160 formed by the second side of the heat-exchanging corrugated panels 133, further comprise a front and back end, with the front and back ends preferably sealed (closed) by either seam or spot welding 168 to isolate the exhaust air from other air flows, as shown.

Preferably, as shown in FIG. 5, the liquid coolant spray assembly 152 is essentially rectangular and sized to provide coolant spray to substantially the entire liquid coolant spray chamber 142. The liquid coolant spray assembly 152 is preferably comprised of one-inch OD PVC piping and fittings with a plurality of holes drilled on the underside of the piping to effect the coolant spray, as shown (under appropriate circumstances, other piping materials may be used).

Figure 5A:
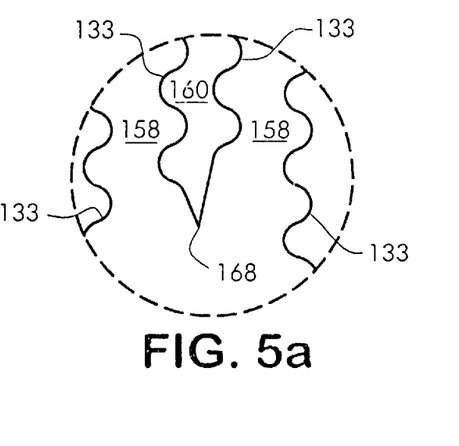
FIG. 5a is a detailed view through section 5a—5a of FIG. 5.

FIG. 5a is an enlarged detailed view through section 5a—5a of FIG. 5. This detailed view illustrates the first side air channels 158 formed by the first side of heat-exchanging corrugated panels 133 that provide for passage of intake air into the cooling system 100, and the second side air channels 160, formed by the second side of the heat-exchanging corrugated panels 133, that provide for passage of the outgoing air from the cooling system 100 (embodying herein at least one incoming air passage structured and arranged to provide passage into such at least one container and at least one outgoing air passage structured and arranged to provide passage out of such at least one container). As shown, the second side of the heat exchange panels 160 is isolated from other airflows, preferably, sealed (closed) by either seam or spot welding 168, as shown.

FIG. 6 is a sectional view through the section 6—6 of FIG. 5. As shown in FIG. 6, preferably, an electrically operated valve 162 is used to direct the flow of the liquid coolant from the pump 118, either to the liquid coolant transfer system 150, or to at least one liquid coolant discharge fitting 164. In the preferred embodiment, the liquid coolant discharge fitting 164 is preferably at least one standard garden hose fitting and is used as a hose connection point for further directing the discharging liquid coolant periodically pumped from the cooling system 100.

FIG. 7 is a sectional view through the section 7—7 of FIG. 5. As shown in FIG. 7, at least one hinged lid 124 of the cooling system 100 pivots on at least one lid hinge 125. Additionally, FIG. 7 illustrates the relationship between the heat-exchanging corrugated panels 133, the first side air channels 158 (that provide for horizontal passage of intake air into the cooling system 100), and the second side air channels 160 (that provide for vertical passage of the outgoing air from the cooling system 100). !Also illustrated are the first side air channel top closures 157 and first side air channel bottom closures 159, as shown.

Figure 8:
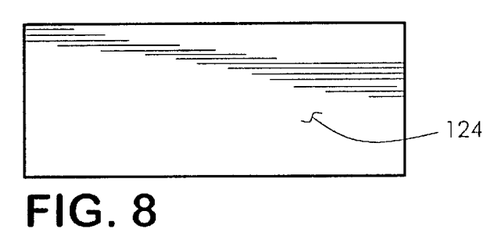
FIG. 8 is a top view of the cooling system of FIG. 3, according to a preferred embodiment of the present invention.
Figure 9:
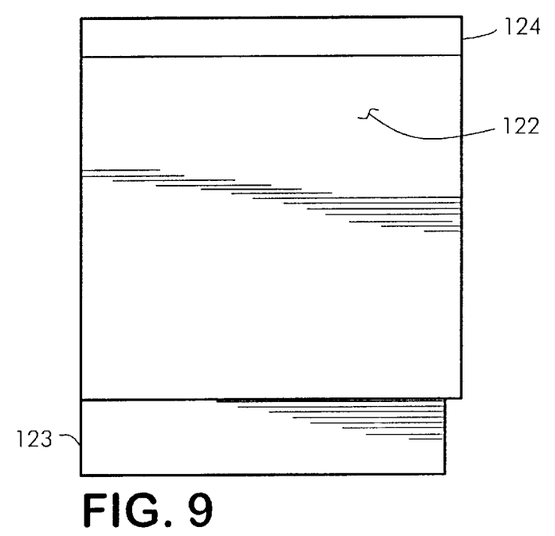
FIG. 9 is a front side view of the cooling system of FIG. 3, according to a preferred embodiment of the present invention.
Figure 10:
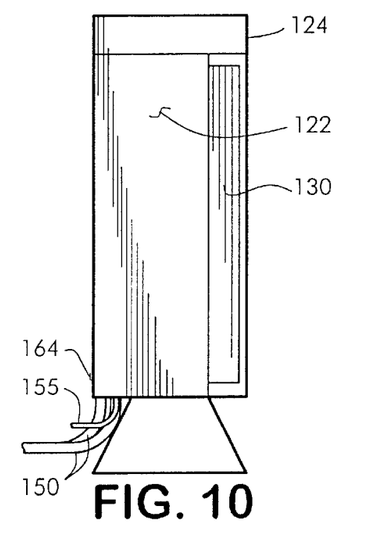
FIG. 10 is a right side view of the cooling system of FIG. 3, according to a preferred embodiment of the present invention.
Figure 11:
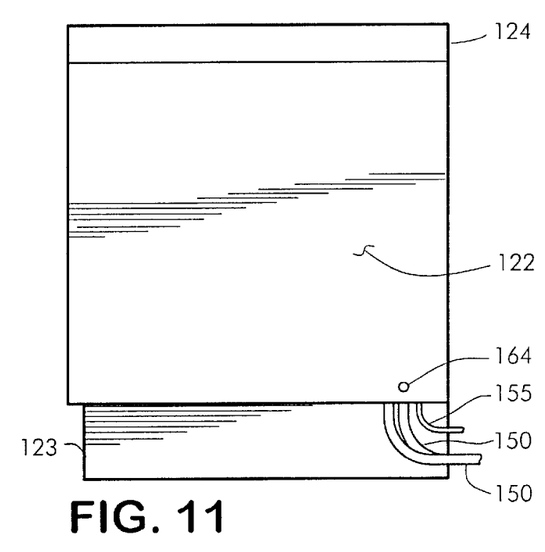
FIG. 11 is a backside view of the cooling system of FIG. 3, according to a preferred embodiment of the present invention.
Figure 12:
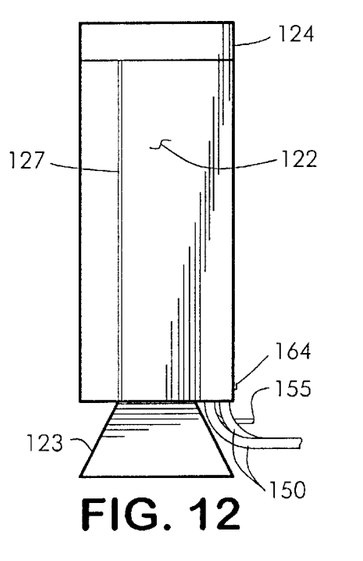
FIG. 12 is a left side view of the cooling system of FIG. 3, according to a preferred embodiment of the present invention.

FIG. 8 is a top view of the cooling system 100 of FIG. 3, according to a preferred embodiment of the present invention. FIG. 9 is a front side view of the cooling system 100 of FIG. 3, according to a preferred embodiment of the present invention. FIG. 10 is a right side view of the cooling system 100 of FIG. 3, according to a preferred embodiment of the present invention. As shown in FIG. 10, more clearly illustrated from the right side view are the screen filter 130, the liquid coolant supply tubing 155, and the liquid coolant discharge fitting 164. FIG. 11 is a backside view of the cooling system 100 of FIG. 3, according to a preferred embodiment of the present invention. FIG. 12 is a left side view of the cooling system 100 of FIG. 3, according to a preferred embodiment of the present invention.

Figure 13:
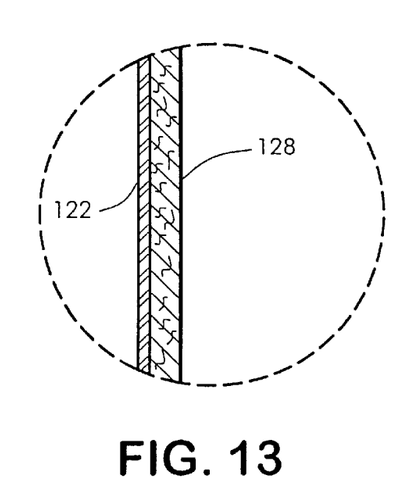
FIG. 13 is an enlarged detailed view through the section 13—13 of FIG. 6.
Figure 14:
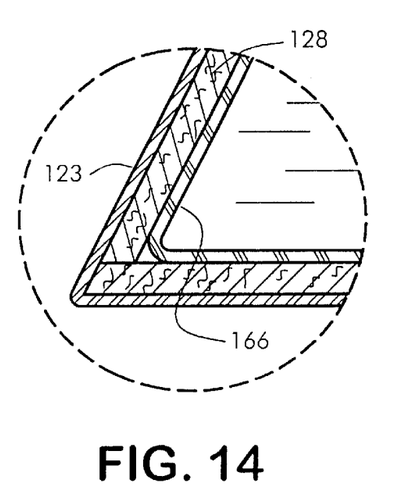
FIG. 14 is an enlarged detailed view through the section 14—14 of FIG. 6.
Figure 15:
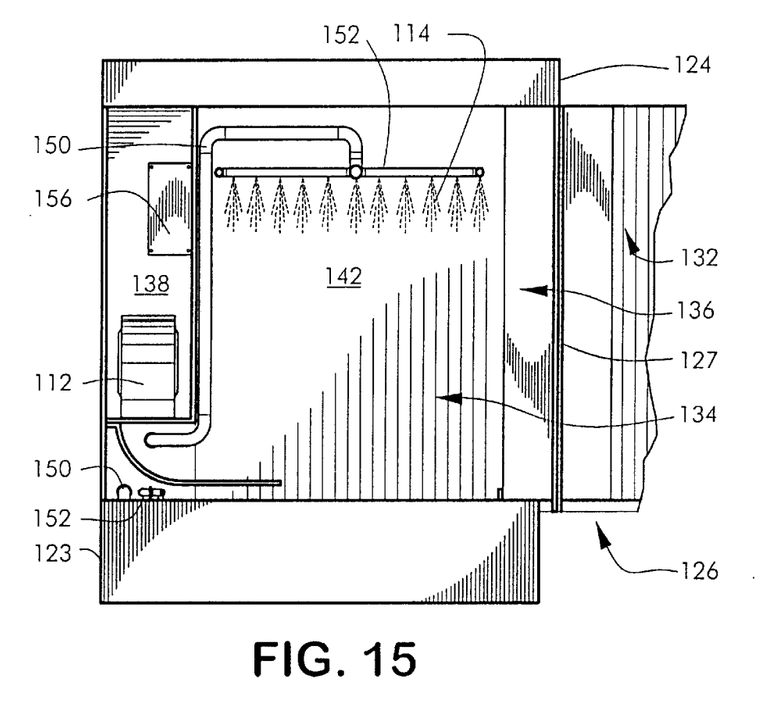
FIG. 15 is a sectional view of the cooling system with the hinged door in an open position.

As shown in FIG. 12, the door hinge 127 of the hinged door is more clearly illustrated. FIG. 13 is an enlarged detailed view through the section 13—13 of FIG. 6. FIG. 13 shows the container 122 as substantially lined with at least one radiant barrier 128 (the radiant barrier material equal to "Microfoil" available from Packaging Technologies, Inc.). The radiant barrier 128 provides both insulation and a radiant shield for the container 122 (embodying herein a substantial portion of such at least one container further comprising a thermal insulation, structured and arranged to thermally insulate such interior of such at least one container from such exterior of such at least one container). FIG. 14 is an enlarged detailed view through the section 14—14 of FIG. 6. FIG. 14 shows a detail at the angular container base 123. Preferably, the angular container base 123 is lined with at least one radiant barrier 128 and fitted with at least one liquid coolant supply collector liner 166. The liquid coolant supply collector liner 166 is preferably constructed from blow-molded polycarbonate (under appropriate circumstances, other liner materials may suffice). FIG. 15 is a sectional view of the cooling system 100. FIG. 15 illustrates the cooling system 100 with the hinged door 126 in the open position.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claim.

Having fully described the invention in such clear and concise terms as to enable those skilled in the art to understand and practice the same, the invention claimed is:

1. Apparatus comprising:
   a wetting chamber;
   an intake duct for conducting intake air to the wetting chamber;
   an outtake duct for conducting outtake air from the wetting chamber;
   the intake and outtake ducts constructed and arranged to isolate intake air flow through the intake duct from outtake air flow through the outtake duct;
   a thermally conductive component for transferring heat between the intake duct and the outtake duct;
   a liquid reservoir;
   a liquid transfer system for moving liquid from the reservoir to the wetting chamber and for dispersing the liquid into the wetting chamber and into a flow of air passing therethrough from the intake duct to the outtake duct;

the reservoir disposed for collecting the liquid from the wetting chamber;

a thermally conductive portion of the liquid transfer system intermediate the reservoir and the wetting chamber for transferring heat between outside the thermally conductive portion and the liquid passing therethrough from the reservoir to the wetting chamber;

a conditioning air duct having an inlet and an outlet; and the thermally conductive portion disposed in the conditioning air duct between the inlet and the outlet.

2. Apparatus of claim 1, wherein the thermally conductive component comprises thermally conductive corrugated sheet stock.

3. Apparatus of claim 1, further comprising blower apparatus for forcing intake air into the wetting chamber from the intake duct and outtake air from the wetting chamber through the outtake duct.

4. Apparatus of claim 1, wherein the inlet and the outlet of the conditioning air duct are coupled to an interior of a structure.

5. Apparatus of claim 1, wherein the conditioning air duct is disposed in the interior of the structure.

6. Apparatus of claim 1, further comprising conditioning blower apparatus for forcing air through the conditioning air duct from its inlet to its outlet.

7. Apparatus comprising:

a conditioning air duct having an inlet and an outlet;

a cooling liquid generator including a wetting chamber, an intake duct for conducting intake air to the wetting chamber, an outtake duct for conducting outtake air from the wetting chamber, a thermally conductive component for transferring heat between the intake duct and the outtake duct, and a liquid reservoir;

the intake and outtake ducts constructed and arranged to isolate intake air flow through the intake duct from outtake air flow through the outtake duct; and a liquid transfer system, having a thermally conductive portion disposed in the conditioning air duct between the inlet and the outlet, for moving liquid from the reservoir and through the thermally conductive portion to the wetting chamber and for dispersing the liquid into the wetting chamber and into a flow of air passing therethrough from the intake duct to the outtake duct;

wherein the reservoir is disposed to collect the liquid from the wetting chamber and the thermally conductive portion of the liquid transfer system is capable of transferring heat between outside the thermally conductive portion and the liquid passing therethrough from the reservoir to the wetting chamber.

8. Apparatus of claim 7, wherein the inlet and the outlet of the conditioning air duct are coupled to an interior of a structure.

9. Apparatus of claim 8, wherein the conditioning air duct is disposed in the interior of the structure.

10. Apparatus of claim 8, wherein the cooling liquid generator is disposed exteriorly of the structure.

11. Apparatus of claim 7, wherein the thermally conductive component has a first corrugated face facing into the intake duct and a second corrugated face facing into the outtake duct.

12. Apparatus of claim 7, further comprising blower apparatus for forcing intake air into the wetting chamber from the intake duct and outtake air from the wetting chamber through the outtake duct.

13. Apparatus of claim 7, further comprising conditioning blower apparatus for forcing air through the conditioning air duct from its inlet to its outlet.

14. Apparatus comprising:

a conditioning air duct having an inlet and an outlet coupled to an interior of a structure;

a cooling liquid generator disposed exteriorly of the structure, the cooling liquid generator including a wetting chamber, an intake duct for conducting intake air to the wetting chamber, an outtake duct for conducting outtake air from the wetting chamber, a thermally conductive component for transferring heat between the intake duct and the outtake duct, and a liquid reservoir;

the intake and outtake ducts constructed and arranged to isolate intake air flow through the intake duct from outtake air flow through the outtake duct; and a liquid transfer system, having a thermally conductive portion disposed in the conditioning air duct between the inlet and the outlet, for moving liquid from the reservoir and through the thermally conductive portion to the wetting chamber and for dispersing the liquid into the wetting chamber and into a flow of air passing therethrough from the intake duct to the outtake duct;

wherein the reservoir is disposed to collect the liquid from the wetting chamber and the thermally conductive portion of the liquid transfer system is capable of transferring heat between outside the thermally conductive portion and the liquid passing therethrough from the reservoir to the wetting chamber.

15. Apparatus of claim 14, wherein the conditioning air duct is disposed in the interior of the structure.

16. Apparatus of claim 14, wherein the thermally conductive component has a first corrugated face facing into the intake duct and a second corrugated face facing into the outtake duct.

17. Apparatus of claim 14, further comprising blower apparatus for forcing intake air into the wetting chamber from the intake duct and outtake air from the wetting chamber through the outtake duct.

18. Apparatus of claim 14, further comprising conditioning blower apparatus for forcing air through the conditioning air duct from its inlet to its outlet.

* * * * *